United States Patent [19]

Nagasaki

[11] Patent Number: 4,497,322

[45] Date of Patent: Feb. 5, 1985

[54] ULTRASONIC DETECTION APPARATUS

[75] Inventor: Tatsuo Nagasaki, Musashino, Japan

[73] Assignee: Olympus Optical Co. Limited, Japan

[21] Appl. No.: 384,497

[22] Filed: Jun. 3, 1982

[30] Foreign Application Priority Data

Jun. 5, 1981 [JP] Japan .............................. 56-85616

[51] Int. Cl.³ .............................................. A61B 10/00
[52] U.S. Cl. ...................................... 128/660; 73/626
[58] Field of Search ............................... 128/660–661; 73/626, 606

[56] References Cited

U.S. PATENT DOCUMENTS 4,212,206 7/1980 Hartemann et al. ............ 128/660 X

Primary Examiner—Kyle L. Howell
Assistant Examiner—Francis J. Jaworski
Attorney, Agent, or Firm—Parkhurst & Oliff

[57] ABSTRACT

An electronic scan type ultrasonic diagnosis apparatus for forming a tomographic image of a patient body is disclosed. In order to focus ultrasonic waves emitted from a probe having an array of electroacoustic oscillators, driving pulses are delayed by a surface wave delay device. The delay device has a surface wave propagating medium, a first transducer including a main surface wave electrode and two sub surface wave electrodes, and a second transducer including an array of surface wave electrodes. The main and sub electrodes of the first transducer are arranged along an arc having a center situating at a middle point of the electrode array of the second transducer and the surface wave electrodes of the second transducer are arranged along an arc having a center situating on a center line connecting the main electrode and the middle point of the second transducer and a radius which is a half of that of the arc along which the main and sub electrodes are arranged. In order to remove the influence of quantization side lobes which appear in an ultrasonic wave beam pattern emitted from the probe, the sub electrodes are spaced equidistantly from the main electrode by such a distance that lines connecting respective sub elements with the middle point make angles $\pm\theta$ which are equal to angles between the quantization side lobes and a main lobe of the emitted ultrasonic wave beam pattern.

6 Claims, 12 Drawing Figures

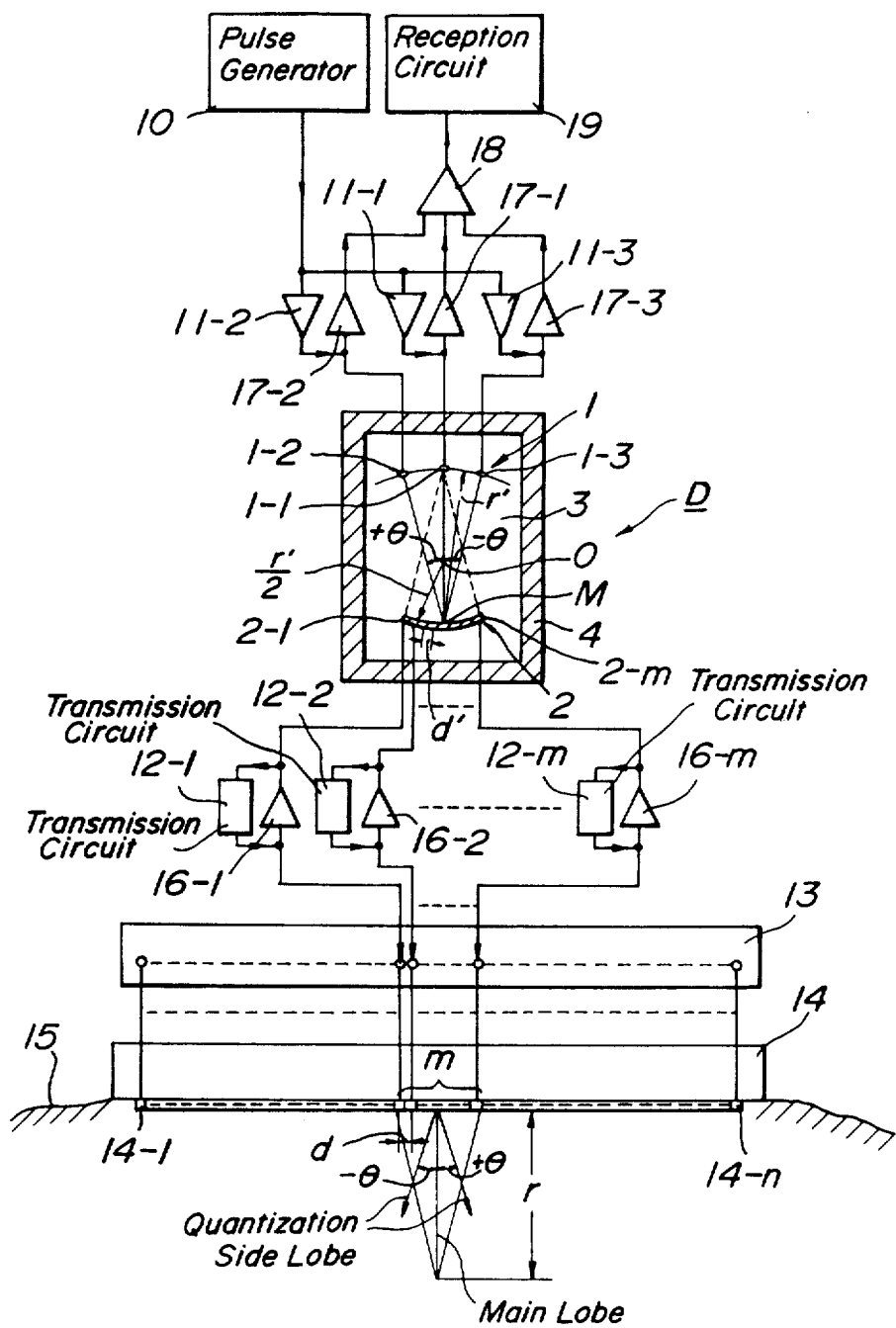

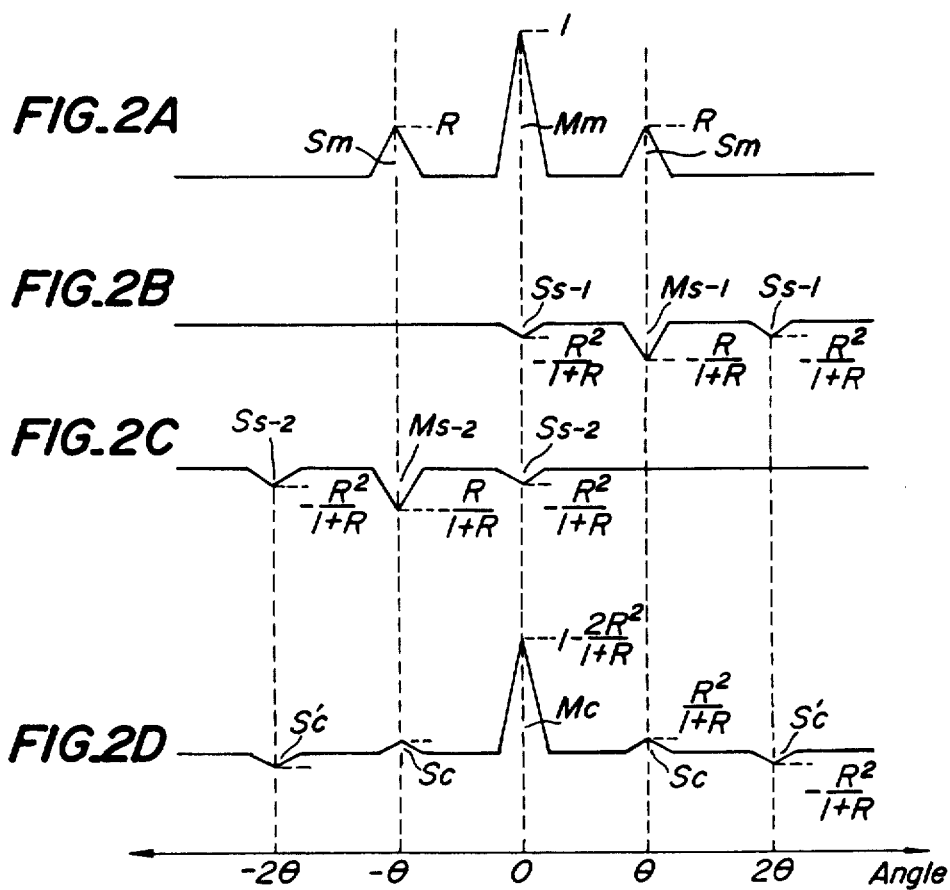

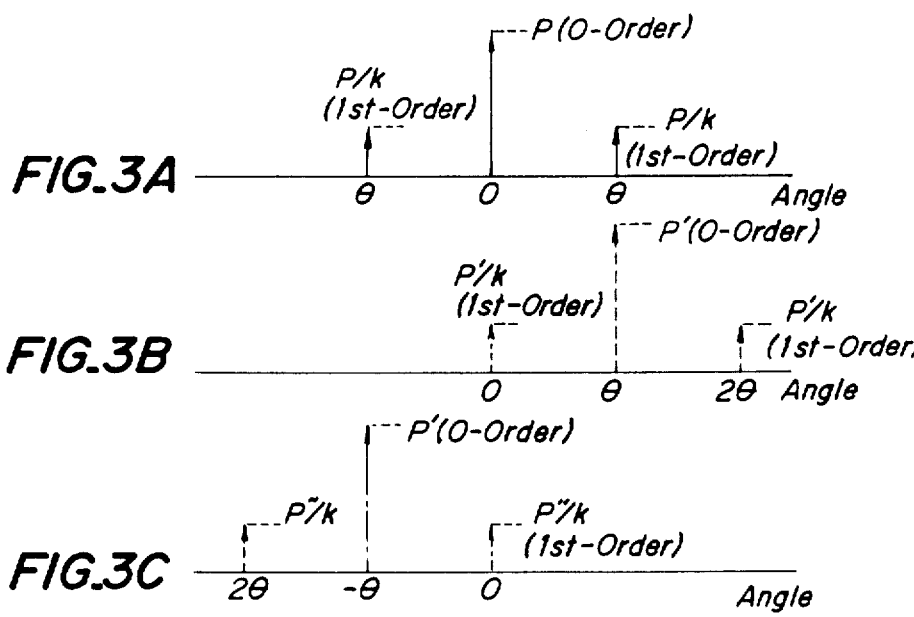

ULTRASONIC DETECTION APPARATUS

BACKGROUND OF THE INVENTION

This invention relates to an ultrasonic detection apparatus, and more particularly to an ultrasonic detection apparatus which can remove the influence of quantization side lobes on a tomographic image.

Detection apparatus utilizing acoustic energy has been embodied as an ultrasonic diagnosis apparatus for forming a tomographic image of a patient body. The ultrasonic diagnosis apparatus may be classified into a mechanical scan type and an electronic scan type. In the electronic scan type apparatus, a probe is formed by an array of oscillators (transducers) arranged linearly and a sector or linear scan is effected by controlling the timing of transmission and reception of acoustic energy at respective oscillators. For instance, in an electronic linear scan type apparatus, in order to focus beams of ultrasonic energy emitted from a plurality of oscillators into a given position, delay circuits having different delay times are inserted between a driving circuit, i.e. a pulse source and the oscillators. Heretofore, the delay circuits have been composed of a lumped circuit comprising a delay line with taps. In an electronic sector scan type apparatus, there are also provided a plurality of delay circuits having different delay times in order to focus the transmitted ultrasonic beams as well as to deflect the focused beams over a given angle.

In order to improve resolution of a displayed image in the ultrasonic diagnosis apparatus, the driving pulse must have a high frequency and a wide bandwidth. However, the characteristics of the delay line such as its frequency property, group delay property and reflection property are liable to be worse in proportion to the increase of the driving pulse frequency and bandwidth. For eliminating such a drawback, the number of stages of the tapped delay line should be increased and L and C should be accurately determined. Therefore, the delay line becomes expensive exponentially.

The inventor has already proposed an ultrasonic diagnosis apparatus utilizing a surface wave delay device which can overcome the drawbacks of the usual delay line. This surface wave delay device comprises a surface wave propagating medium, at least one first electroacoustic transducer provided on a surface of the medium, and a plurality of second electroacoustic transducers provided on the same surface of the medium in such a manner that distances between the first electroacoustic transducer and respective second electroacoustic transducers are made different. By utilizing such a surface wave delay line, the above mentioned drawbacks can be removed, but there is still another problem to be solved.

In the electronic scan type apparatus, since the probe comprises a plurality of oscillators arranged in a discrete manner, the generation of quantization side lobes in addition to a main lobe is inevitable. It has been confirmed that an influence of the quantization side lobes upon a tomographic image can be removed by decreasing an output level of the quantization side lobes by a given value such as 40 dB. However, in practice, it is very difficult to decrease the output level of the quantization side lobes by the predetermined amount and therefore, it is difficult to suppress effectively the influence of the side lobes upon the tomographic image.

SUMMARY OF THE INVENTION

The present invention has for its object to provide an improved ultrasonic detection apparatus which can provide an ultrasonic image having high quality, resolution and reliability by simply removing the influence of the quantization side lobes upon the image.

According to the invention, in an ultrasonic detection apparatus for forming a tomographic image of an object comprising means for generating driving pulses;

means for delaying the driving pulses by predetermined delay times to produce delayed driving pulses;

probe means having an array of a plurality of electroacoustic oscillator elements arranged at a given pitch for generating focused ultrasonic waves in response to said delayed driving pulses into said object and for receiving ultrasonic waves reflected by the object to produce electric signals; and means for receiving said electric signals by means of said delaying means to display a tomographic image of the object, the improvement resides in that said delaying means comprises a surface wave propagating medium, a first electroacoustic transducer including at least one main surface wave electrode applied on a surface of the propagating medium and a plurality of sub surface wave electrodes provided on the same surface of the propagating medium, and a second electroacoustic transducer including an array of surface wave electrodes provided on the same surface of the propagating medium, said main and sub surface wave electrodes of the first electroacoustic transducer are arranged along an arc having a center situating at a middle point of the second electroacoustic transducer and said sub surface wave electrodes are so arranged that lines connecting respective sub surface wave electrodes with said middle point make, with respect to a line connecting the main surface wave electrode with said middle point, angles which are equal to angles between a main lobe and quantization side lobes of the ultrasonic wave beam emitted from said probe means.

BRIEF DESCRIPTION OF THE DRAWINGS

FIG. 1 is a schematic view showing an embodiment of the ultrasonic detection apparatus according to the invention;

FIGS. 2A to 2D are graphs showing main and side lobe components for explaining an operation of the apparatus shown in FIG. 1;

FIGS. 3A to 3C are graphs illustrating signal components for explaining an operation of the apparatus shown in FIG. 1; and FIGS. 4A to 4D are vector diagrams of the surface wave produced in the apparatus in FIG. 1.

DESCRIPTION OF THE PREFERRED EMBODIMENTS

FIG. 1 shows an embodiment of the ultrasonic detection apparatus according to the invention. The present apparatus is of electronic linear scan type. The apparatus comprises a delay device D which includes a surface wave propagating medium 3, a first electroacoustic transducer 1 consisting of a main surface wave electrode 1-1 and two sub surface wave electrodes 1-2 and 1-3 arranged on both sides of the main electrode 1-1, and a second electroacoustic transducer 2 consisting of m surface wave electrodes 2-1 to 2-m, all of these electrodes being applied on the same surface of the surface wave propagating medium 1. As is known in the art the surface wave electrode may be formed by interdigitally arranged electrode elements. The electrodes 1-1 to 1-3 of the first transducer 1 are arranged on an arc having a center at a middle point M of the second transducer 2, and a radius of r'. The sub electrodes 1-2 and 1-3 are so arranged with respect to the main electrode 1-1 that lines connecting each of the sub electrodes with the middle point M of the second transducer 2 form angles of $\pm\theta$ together with a center line connecting the main electrode 1-1 with the middle point M. Now it is assumed that $\lambda$ is a wavelength of ultrasonic wave propagating in a living body to be studied and d is a pitch of an oscillator array forming a probe to be described later. Then, said angle $\pm\theta$ may be expressed as follows.

$$\pm\theta = \arcsin \lambda/d$$

The electrodes 2-1 to 2-m of the second transducer 2 are arranged with a given pitch on an arc which has a center 0 situating on the center line connecting the main electrode 1-1 with the middle point M and a radius of r'/2. In this manner, the surface wave emitted from the first transducer 1 is received by the second transducer 2 and vice versa. On that surface area of the surface wave propagating medium 3 which locates outside a propagating path between the transducers 1 and 2 is provided a surface wave absorption member 4 for removing undesired reflection of the surface wave.

The surface wave propagating medium 3 may be made of piezoelectric material having small temperature coefficients for propagating speed and thermal expansion. The surface wave absorption member 4 may be composed of material having the same acoustic impedance as the piezoelectric material and a large damping property, and may be made of silicon rubber having tungsten powders dispersed therein. It is preferable that the absorption member 4 is tapered in such a manner that its thickness becomes larger toward the outside.

As illustrated in FIG. 1, the electrodes 1-1 to 1-3 of the first electroacoustic transducer 1 receive driving pulses from a pulse generator 10 via respective amplifiers 11-1 to 11-3 to emit surface waves into the propagating medium 1. The surface waves thus emitted are received by the electrodes 2-1 to 2-m of the second electroacoustic transducer 2 which then produce output signals. These output signals are shaped and amplified in respective transmission circuits 12-1 to 12-m and the amplified signals are supplied through a multiplexer 13 to m oscillators of a probe 14 which comprises a number of oscillators 14-1 to 14-n (electroacoustic transducer elements) arranged linearly at the above mentioned pitch d. Then, the excited oscillators emit into a living body 15 ultrasonic wave beams which are focused at a predetermined point. By successively selecting m oscillators of the probe 14 by means of the multiplexer 13, the linear scan can be effected.

Now it is assumed that V represents a propagation speed of the ultrasonic wave in the living body 15, V' a propagation speed of the surface wave in the propagating medium 3, and d' denotes the pitch of the surface wave electrodes 2-1 to 2-m of the second electroacoustic transducer 2. When the apparatus is constructed to satisfy a relation of $d = d' \times (V/V')$, the ultrasonic wave beams emitted from the probe 14 are focused at a distance $r = r' \cdot (V/V')$.

The ultrasonic wave beams reflected by the living body 15 are received by the m oscillators from which the ultrasonic wave beams are emitted, and output signals from these m oscillators are amplified by respective preamplifiers 16-1 to 16-m. Then the electrodes 2-1 to 2-m of the second transducer 2 are excited by respective amplified signals to emit surface waves which are then received by the surface wave electrodes 1-1 to 1-3 of the first transducer 1. Output signals from the electrodes 1-1 to 1-3 are amplified by respective amplifiers 17-1 to 17-3 and the amplified signals are summed by an adder 18. By suitably processing an output signal from the adder 18 in a reception circuit 19, a tomographic image of the living body 15 can be displayed.

In the above explained apparatus, if only the main electrode 1-1 of the first transducer 1 is excited, there are generated a main lobe extending perpendicularly to the probe 14 and quantization side lobes extending in directions making angles of $\pm\theta$ with respect to the main lobe as illustrated in FIG. 1. These angles $\pm\theta$ may be expressed by $\pm \arcsin \lambda/d$ if neglecting higher order diffraction. In the present embodiment, the sub electrodes 1-2 and 1-3 of the first transducer 1 are so arranged that the lines connecting each of these electrodes 1-2 and 1-3 with the middle point M of the second transducer 2 make the angles $\pm\theta$ with respect to the center line connecting the main electrode 1-1 with the middle point M, and the surface waves emitted from the sub electrodes 1-2 and 1-3 are superimposed upon the surface wave emitted from the main electrode 1-1. Therefore, if the main and sub electrodes 1-1, 1-2 and 1-3 are excited independently, the ultrasonic wave beam pattern emitted from the probe 14 has equal phase terms at positions equally spaced from a middle point of the m simultaneously excited oscillators.

Now it is assumed as shown in FIG. 2A that the ultrasonic wave beam pattern emitted from the probe 14 by exciting only the main electrode 1-1 includes a main lobe $M_m$ having an instantaneous value of 1, and quantization side lobes Sm extending in the $+\theta$ and $-\theta$ directions having instantaneous values of $R(0 < R < 1)$. Then, the amplifier 11-2 connected to the sub electrode 1-2 is so adjusted that the ultrasonic wave beam pattern emitted form the probe 14 by exciting only the sub electrode 1-2 includes a main lobe $M_{s-1}$ extending in the direction of angle $+\theta$ and having a value $$-\left(\frac{R}{1+R}\right).$$

That is to say the main lobe $M_{s-1}$ of the ultrasonic wave produced by exciting the sub electrode 1-2 has an amplitude equal to $$\left|\frac{R}{1+R}\right|$$

and a phase opposite to that of the main lobe $M_m$ as illustrated in FIG. 2B. Then, the ultrasonic wave beam emitted from the probe 14 in case of exciting only the sub electrode 1-2 has side lobes $S_{s-1}$ extending in directions of angle zero, and $+2\theta$ and having a value of $$\frac{R^2}{1+R}.$$

Similarly, the amplifier 11-3 connected to the sub electrode 1-3 is so adjusted that the ultrasonic wave beam pattern includes a main lobe $M_{s-2}$ extending in the direction of angle $-\theta$ and having a value $$\frac{R}{1+R}$$

and side lobes $S_{s-2}$ extending in directions of angle 0 and $-2\theta$ and having a value $$\left(\frac{R^2}{1+R}\right)$$

as shown in FIG. 2C. Therefore, when the main and sub electrodes 1-1 to 1-3 are excited simultaneously by the pulse generator 10 via the amplifiers 11-1 and 11-3 adjusted in the manner explained above, a composite ultrasonic wave beam pattern emitted from the m oscillators of the probe 14 selected by the multiplexer 13 to the living body 15 has a main lobe $M_c$ extending in the direction of angle 0 and having a value $$\left(1 - \frac{2R^2}{1+R}\right),$$

side lobes $S_c$ extending in the direction of the angles $\pm\theta$ and having a value $R^2/(1+R)$ and side lobes $S_c'$ extending in the direction of angles $\pm 2\theta$ and a value $-R^2/(1+R)$ as depicted in FIG. 2D. In this manner, the undesired side lobes $S_c$ extending in the directions of angle $\pm\theta$ can be reduced in the composite ultrasonic wave. For instance, if $R=0.1$, the main lobe $M_c$ in the composite ultrasonic wave becomes $$\left(1 - \frac{2R^2}{1+R}\right) = 0.98.$$

whereas the quantization side lobes $S_c$ becomes $$\left(\frac{R^2}{1+R}\right) = 0.009.$$

That is to say, the quantization side lobes in the directions of angles $\pm\theta$ can be reduced to a very small amount such as 0.9% of the main lobe $M_c$. Contrary to this, in the known apparatus, the quantization side lobes $S_m$ have very large amplitudes such as 10% of the main lobe $M_m$.

In the embodiment so far explained, the quantization side lobes are reduced by adjusting the gains of the amplifiers 11-2 and 11-3 provided in the transmitting circuit. The principle of the present invention may be equally applied to the receiving circuit. Now this will be explained with reference to FIGS. 3A to 3C and 4A to 4D.

An image constructed by the ultrasonic wave reflected from the direction of the main lobe is formed on the main electrode 1-1 of the first transducer 1. At the same time, an image of first order diffraction constructed by the ultrasonic wave reflected from the side lobes is also superimposed upon said image at the main electrode 1-1. As explained above, since the sub electrodes 1-2 and 1-3 are spaced apart from the main electrode 1-1 equidistantly, diffraction images of zero order and first order formed at the main and sub electrodes 1-1 to 1-3 by means of the ultrasonic waves reflected from certain directions such as the main and side lobe directions have equal phase terms. Now it is assumed that a zero order image formed by the ultrasonic wave reflected from the direction of the main lobe has an instantaneous value P as shown in FIG. 3A, and zero order images formed by the ultrasonic waves reflected from the quantization side lobes have instantaneous value P' and P'' as depicted in FIGS. 3B and 3C, and further that first order diffraction images composed of these ultrasonic waves have values $\pm P/k$, $\pm P'/k$ and $\pm P''/k$ (k > 1), respectively. Then, an amplitude $P_1$ of the surface waves received by the main electrode 1-1 become $$P_1 = P + \frac{P' + P''}{k}$$

as shown in FIG. 4A and amplitudes of surface waves received by the sub electrodes 1-2 and 1-3 become
$P'' + (P/k)$
and $P' + (P/k)$,
respectively. Therefore, when gains of the amplifiers 17-2 and 17-3 connected to the sub electrodes 1-2 and 1-3, respectively are set to $-1/k$, output signals $P_2$ and $P_3$ from the amplifiers 17-2 and 17-3 become $$P_2 = -\left(\frac{P'}{k} + \frac{P}{k^2}\right)$$

and $$P_3 = -\left(\frac{P''}{k} + \frac{P}{k^2}\right),$$

respectively as illustrated in FIGS. 4B and 4C. Then, by adding the output signals from the amplifiers 17-1 to 17-3 in the adder 18, there is obtained an output signal $$P_1 + P_2 + P_3 = \left(1 - \frac{2}{k^2}\right) P$$

as shown in FIG. 4D. It is apparent that from the output signal $$\left(1 - \frac{2}{k^2}\right) P$$

any component of the first order diffraction images, i.e. P' and P'' components have been cancelled out. This principle is to eliminate the influence of the quantization side lobes in the stage of a spacial frequency in the surface wave propagating medium 3 by constructing an equivalent special filter by means of the sub electrodes 1-2, 1-3 and the adder 18.

The present invention is not limited to the embodiments explained above, but may be modified in various manners. In the above embodiment, the quantization side lobes in the ultrasonic wave emitted from the probe 14 are suppressed by adjusting the amplifiers 11-1 to 11-3 in the transmitter or the signal components due to the ultrasonic waves reflected from the quantization side lobes are suppressed by adjusting the amplifiers 17-1 to 17-3 in the receiver. However, according to the invention the above two measures may be taken by adjusting the amplifiers 11-1 to 11-3 and 17-1 to 17-3 both in the transmitter and receiver. In this case the amplifiers may be so adjusted that the main lobe of the ultrasonic wave beam emitted from the probe 14 becomes equivalently equal to $-R/(1+R)$ both in the transmission and reception sides. Further, the present invention may be effectively applied to electronic scan type and mechanical scan type ultrasonic wave diagnosis apparatus and to ultrasonic measuring and detecting apparatus with or without the scanning function.

As explained above in detail, according to the invention, the influence of the undesired quantization side lobes can be removed effectively and simply and thus, it is always possible to obtain a tomographic image having very high quality, resolution and reliability.

What is claimed is:

1. In an ultrasonic detection apparatus for forming a tomographic image of an object comprising
    means for generating driving pulses;
    means for delaying the driving pulses by predetermined delay times to produce delayed driving pulses;
    probe means having an array of a plurality of electroacoustic oscillator elements arranged at a given pitch for generating focused ultrasonic waves in response to said delayed driving pulses into said object and for receiving ultrasonic waves reflected by the object to produce electric signals; and
    display means for receiving said electric signals by means of said delaying means to display a tomographic image of the object, the improvement wherein said delaying means comprises a surface wave propagating medium, a first electroacoustic transducer including at least one main surface wave electrode applied on a surface of the propagating medium and a plurality of sub surface wave electrodes provided on the same surface of the propagating medium, and a second electroacoustic transducer including an array of surface wave electrodes provided on the same surface of the propagating medium, said main and sub surface wave electrodes of the first electroacoustic transducer being arranged along an arc having a center situating at a middle point of the second electroacoustic transducer and said sub surface wave electrodes being so arranged that lines connecting respective sub surface wave electrodes with said middle point make, with respect to a line connecting the main surface wave electrode with said middle point, angles which are equal to angles between a main lobe and quantization side lobes of the ultrasonic wave beam emitted from said probe means.

2. An apparatus according to claim 1, wherein said first electroacoustic transducer comprises one main surface wave electrode and two sub surface wave electrodes which are spaced from the main surface wave electrode by equal distances.

3. An apparatus according to claim 2, wherein said surface wave electrodes of the second electroacoustic transducer are arranged along an arc having a center on the line connecting the main surface wave electrode with the middle point of the second electroacoustic transducer and having a radius which is a half of a radius of said arc along which said main and sub surface wave electrodes are arranged.

4. An apparatus according to claim 1, having m electrodes in said array of surface wave electrodes and n elements in said array of electroacoustic oscillator elements, and further comprising a multiplexer having m inputs connected to said m surface wave electrodes of the second electroacoustic transducer, n outputs connected to said n electroacoustic oscillator elements, and switches for connecting the m inputs to m elements among the n electroacoustic oscillator elements each time the driving pulse is generated.

5. An apparatus according to claim 1, further comprising amplifier means connected between the driving pulse generating means and the main and sub surface wave electrodes of the first electroacoustic transducer for adjusting amplitudes of the driving pulses supplied to the main and sub surface wave electrodes in such a manner that when it is assumed that main and side lobes of an ultrasonic wave beam emitted from the probe means by exciting only the main surface wave electrode have values of 1 and $R(0<R<1)$, respectively, a main lobe of an ultrasonic wave beam emitted from the probe means by exciting each of said sub surface wave electrodes has a value of $-R/(1+R)$.

6. An apparatus according to claim 1, further comprising amplifier means connected between the first electroacoustic transducer and the display means for adjusting amplitudes of electric signals supplied from the main and sub surface wave electrodes of the first electroacoustic transducer in response to said electric signals in such a manner that when it is assumed that main and side lobes of an ultrasonic wave beam emitted from the probe means by exciting only the main surface wave electrode have values of 1 and $R(0<R<1)$, respectively, a main lobe of an ultrasonic wave beam emitted from the probe means by exciting each of the sub surface wave electrodes has equivalently a value of $-R/(1+R)$.

* * * * *